(12) United States Patent
Kim et al.

(10) Patent No.: US 11,085,375 B2
(45) Date of Patent: Aug. 10, 2021

(54) SYSTEMS FOR FUEL DISTRIBUTION IN A COMBUSTOR ASSEMBLY FOR A GAS TURBINE ENGINE

(71) Applicant: General Electric Company, Schenectady, NY (US)

(72) Inventors: Kihyung Kim, Atlanta, GA (US); Anthony Whittenberg, Greer, SC (US)

(73) Assignee: General Electric Company, Schenectady, NY (US)

( * ) Notice: Subject to any disclaimer, the term of this patent is extended or adjusted under 35 U.S.C. 154(b) by 499 days.

(21) Appl. No.: 15/624,247

(22) Filed: Jun. 15, 2017

(65) Prior Publication Data
US 2018/0363556 A1 Dec. 20, 2018

(51) Int. Cl.
| | |
|---|---|
| *F02C 7/22* | (2006.01) |
| *F23R 3/34* | (2006.01) |
| *F02C 7/232* | (2006.01) |
| *F02C 3/04* | (2006.01) |
| *F23R 3/28* | (2006.01) |
| *F02C 9/34* | (2006.01) |

(52) U.S. Cl.
CPC ............ *F02C 7/222* (2013.01); *F02C 3/04* (2013.01); *F02C 7/232* (2013.01); *F02C 9/34* (2013.01); *F23R 3/28* (2013.01); *F23R 3/343* (2013.01); *F05D 2260/212* (2013.01)

(58) Field of Classification Search
CPC .. F02C 7/22; F02C 7/222; F02C 7/228; F02C 7/232; F02C 7/236; F02C 9/26; F02C 9/263; F02C 9/32
See application file for complete search history.

(56) References Cited

U.S. PATENT DOCUMENTS

| | | | |
|---|---|---|---|
| 8,973,366 B2 | 3/2015 | Zhang et al. | |
| 9,188,061 B2 | 11/2015 | Zhang et al. | |
| 9,459,008 B2 | 10/2016 | Skipper et al. | |
| 2006/0064982 A1* | 3/2006 | Mitten | F02C 7/232 60/734 |
| 2010/0263755 A1* | 10/2010 | Taylor | F02C 7/232 137/613 |
| 2013/0097991 A1* | 4/2013 | Zhang | F23K 5/06 60/39.59 |
| 2014/0137561 A1* | 5/2014 | Crothers | F23R 3/28 60/772 |

(Continued)

FOREIGN PATENT DOCUMENTS

EP 3095987 A1 11/2016

*Primary Examiner* — Craig Kim
(74) *Attorney, Agent, or Firm* — Armstrong Teasdale LLP (57) ABSTRACT

A combustor assembly for a gas turbine engine includes a plurality of combustors spaced circumferentially about the gas turbine engine. Each of the combustors is coupled in flow communication with a manifold configured to channel a liquid to the plurality of combustors. A plurality of fuel lines is coupled in flow communication with the manifold. Each fuel line is coupled in flow communication with a respective combustor of the plurality of combustors. In addition, the combustor assembly includes a flow balance system having a plurality of flow balance devices. Each flow balance device is operatively coupled to one of the fuel lines. Each flow balance device is operative to reduce the flow of liquid to the respective combustor.

20 Claims, 4 Drawing Sheets

(56) References Cited

U.S. PATENT DOCUMENTS

| | | | |
|---|---|---|---|
| 2016/0195024 A1* | 7/2016 | Hoke | F02C 9/34 |
| | | | 701/100 |
| 2017/0037783 A1* | 2/2017 | Ryon | F23R 3/346 |
| 2017/0276367 A1* | 9/2017 | Batakis | F23R 3/346 |
| 2017/0298840 A1* | 10/2017 | Doody | F02C 9/34 |

* cited by examiner

SYSTEMS FOR FUEL DISTRIBUTION IN A COMBUSTOR ASSEMBLY FOR A GAS TURBINE ENGINE

BACKGROUND

The field of the disclosure relates generally to gas turbine engines, and more particularly to systems for improving the flow distribution of liquid fuel systems for combustor assemblies.

At least some known combustors for gas turbine engines include combustors assemblies having multiple combustors oriented in a circumferential array around the gas turbine engine. At least some known pressure atomizing liquid fuel systems for such gas turbine engines have uneven flow distribution characteristics. The uneven flow distribution is typically a result of the static head, or pressure head, of the liquid fuel due to gravity. The uneven flow distribution can result in thermal gradients between combustors of the combustor assembly and incomplete water washing operations for some of the combustors of the combustor assembly. In particular, the bottom combustors (i.e., those combustors nearest the ground) may receive higher flow than the top combustors (i.e., those combustors furthest for the ground) due in part to the static head, or static pressure differences in the liquid.

In such known gas turbine engines, the flow distribution is most sensitive to static head at low flow conditions of the gas turbine engine, such as, low speed operation (i.e., low fuel flow demands) including firing, and water washing operations where only a small amount of water flow is needed. The higher sensitivity at low flow conditions results, in part, because the pressure of the flow is reduced as the flow rate demands decrease. Thus, the static head becomes a larger portion of the entire pressure budget of the flow distribution system. As such, in at least some known gas turbine engines, more flow tends to go through the bottom combustors and, in some instances, nearly no flow is available for the upper combustors.

BRIEF DESCRIPTION

In one aspect, a combustor assembly for a gas turbine engine is provided. The combustor assembly includes a plurality of combustors spaced circumferentially about the gas turbine engine. Each of the combustors is coupled in flow communication with a manifold configured to channel a liquid to the plurality of combustors. In addition, the combustor assembly includes a plurality of fuel lines coupled in flow communication with the manifold. Each fuel line of the plurality of fuel lines is coupled in flow communication with a respective combustor of the plurality of combustors. The combustor assembly further includes a flow balance system comprising a plurality of flow balance devices. Each flow balance device of the plurality of flow balance devices is operatively coupled to one of the fuel lines of the plurality of fuel lines. Each flow balance device is operative to reduce the flow of liquid to the respective combustor of the plurality of combustors.

In another aspect, a gas turbine engine is provided. The gas turbine engine includes a compressor and a combustor assembly coupled in flow communication with the compressor. The combustor assembly includes a plurality of combustors spaced circumferentially about the gas turbine engine. Each of the combustors is coupled in flow communication with a manifold configured to channel a liquid to the plurality of combustors. In addition, the combustor assembly includes a plurality of fuel lines coupled in flow communication with the manifold. Each fuel line of the plurality of fuel lines is coupled in flow communication with a respective combustor of the plurality of combustors. The combustor assembly further includes a flow balance system comprising a plurality of flow balance devices. Each flow balance device of the plurality of flow balance devices is operatively coupled to one of the fuel lines of the plurality of fuel lines. Each flow balance device is operative to reduce the flow of liquid to the respective combustor of the plurality of combustors.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations are identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The exemplary components and methods described herein overcome at least some of the disadvantages associated with known combustor assemblies for gas turbine engines. The embodiments described herein include a flow balance system having one or more flow balance devices coupled between fuel lines of combustors and a fuel manifold. The flow balance devices include, but are not limited to, an orifice plate, a pressure regulator, and a valve. The flow balance system is operable to reduce a flow of liquid to one or more combustors to increase a pressure of the liquid in the fuel manifold, which facilitates reducing the flow variation to each of the combustors of the combustor assembly.

Figure 1:
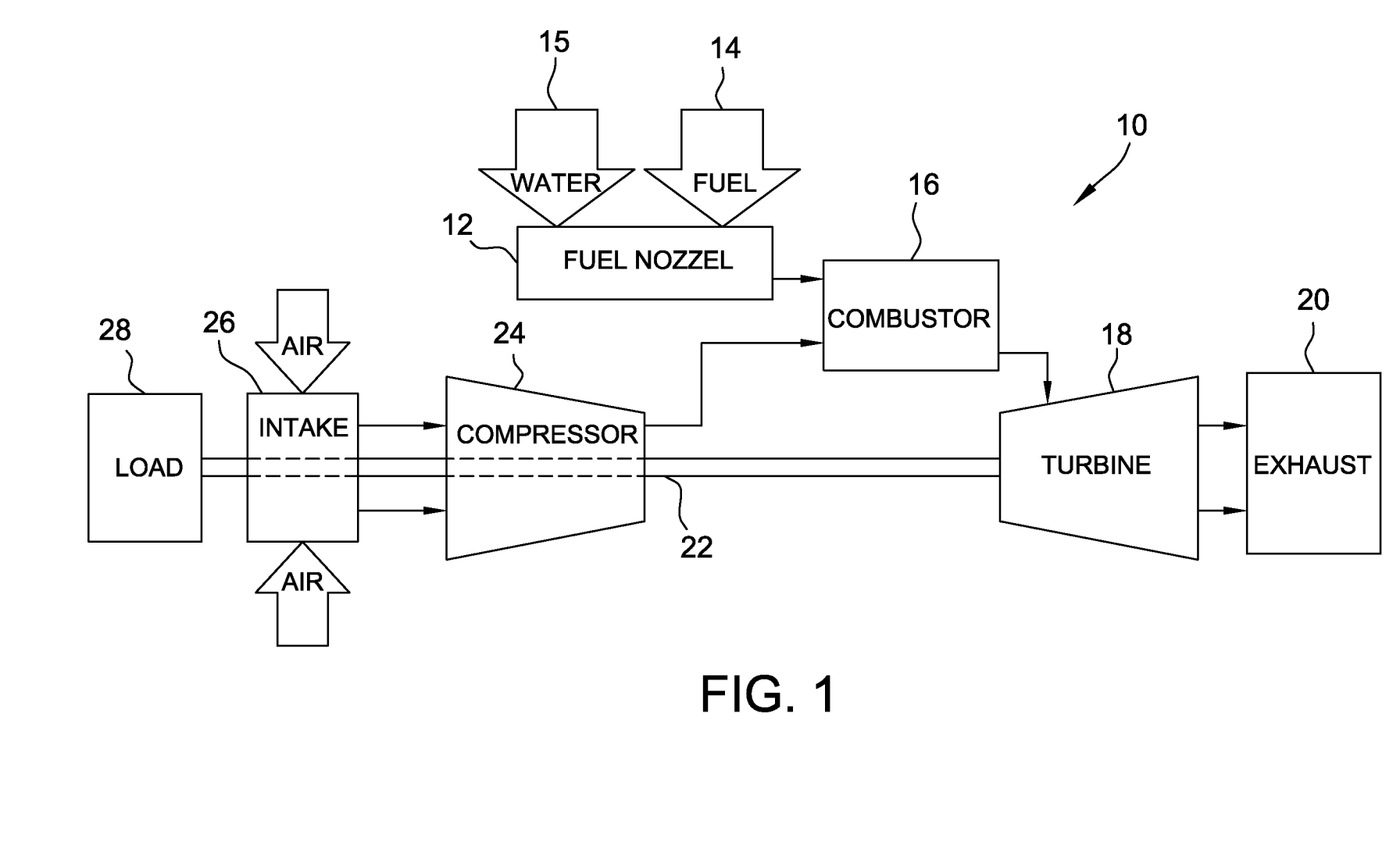
FIG. 1 is a schematic diagram of an exemplary gas turbine engine.

FIG. 1 is a schematic diagram of an exemplary gas turbine engine 10. In the exemplary embodiment, gas turbine engine 10 uses liquid fuel, such as heavy fuel oil, kerosene, naphtha, condensates, and other liquid fuels to operate. One or more fuel nozzles 12 (or fuel injectors) receive a fuel 14 from a fuel source (not shown). In some embodiments, one or more fuel nozzles 12 may receive liquid fuel and one or more other fuel nozzles 12 may be used to receive gaseous fuel (not shown). In the exemplary embodiment, fuel nozzles 12 also receive water 15 from a water source (not shown), for example, when gas turbine engine 10 is operating on liquid fuel. Water 15 may be used and/or available from source in a power plant associated with gas turbine engine 10. For example, and without limitation, water 15 may be used to generate steam in the power plant. Accordingly, in some embodiments, gas turbine engine 10 does not use a separate, dedicated water source only for gas turbine engine 10.

In the exemplary embodiment, gas turbine engine 10 mixes fuel 14 with water 15 upstream from fuel nozzles 12. Mixing fuel 14 with water 15 prior to injection facilitates improving the efficiency of byproduct suppression (e.g., $NO_X$, $SO_X$, CO, or particulate matter), thereby facilitating reducing production of the byproducts from gas turbine engine 10. Fuel nozzles 12 partially mix fuel 14, or the fuel-water mixture, with air, and inject fuel 14, water 15, and the air mixture into a combustor 16. It is noted that fuel nozzle 12 is typically located within combustor 16, although shown schematically as being outside or separate from combustor 16 in FIG. 1. In the exemplary embodiment, fuel 14, water 15, and the air mixture is combusted (or burned) in combustor 16, generating hot pressurized gases (not shown). Combustor 16 channels the gases through a turbine 18 and toward an exhaust outlet 20. While gas turbine engine 10 is illustrated with one combustor 16, it is noted that gas turbine engine 10 typically includes a plurality of combustors 16 arranged circumferentially, or in an annular arrangement, around gas turbine engine 10.

In the exemplary embodiment, each combustor 16 includes one or more separate fuel nozzles 12. As the combusted gases pass through turbine 18, the gases force turbine blades (not shown) to rotate a shaft 22 along an axis of gas turbine engine 10. Shaft 22 is connected to various components of gas turbine engine 10, including, for example, and without limitation, a compressor 24. Compressor 24 includes a plurality of blades (not shown) coupled to shaft 22. As the shaft 22 rotates, compressor 24 also rotates, thereby compressing air from an air intake 26 and channeling the compressed air through the compressor 24 and into fuel nozzles 12 and/or combustor 16. In some embodiments, shaft 22 is coupled to a load 28, which can include, for example, and without limitation, a vehicle or a stationary load, such as, for example, and without limitation, an electrical generator or a propeller on an aircraft. Alternatively, load 28 includes any suitable component capable of being powered by the rotational output of gas turbine engine 10.

Figure 2:
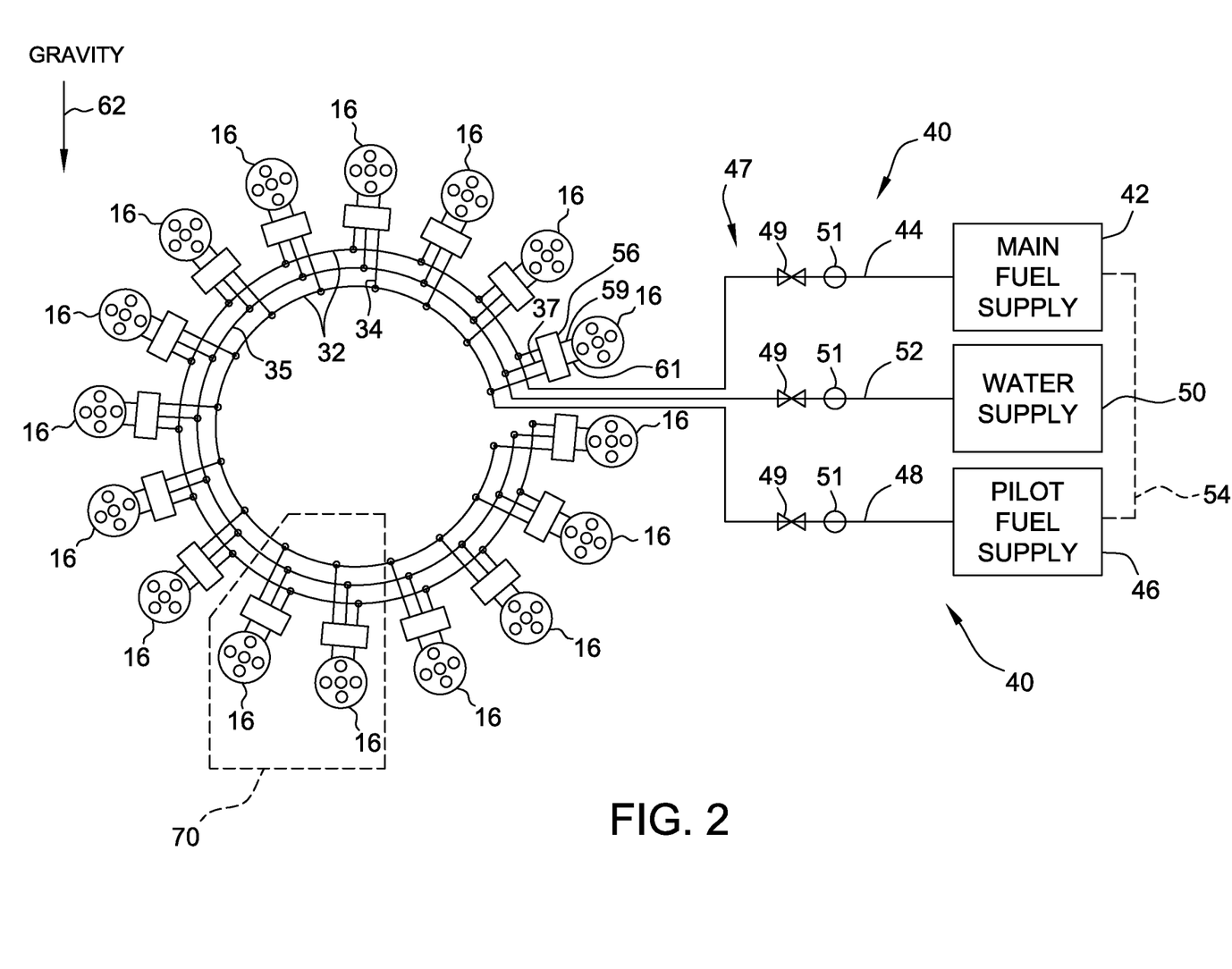
FIG. 2 is a schematic diagram of an exemplary combustor assembly that may be used with the gas turbine engine shown in FIG. 1.

FIG. 2 is a schematic diagram of an exemplary combustor assembly 30 that may be used with gas turbine engine 10 (shown in FIG. 1). Combustor assembly 30 includes a plurality of combustors 16, or another suitable combustor, spaced circumferentially about gas turbine engine 10 (shown in FIG. 1). In the exemplary embodiment, combustor assembly 30 includes sixteen combustors 16. In alternative embodiments, combustor assembly 30 includes any suitable number of combustors 16 that enables combustor assembly 30 to function as described herein.

Each combustor 16 is coupled in flow communication with at least one fuel manifold 32 via a respective fuel line 34, and a water manifold 35 via a water line 37. In the exemplary embodiment, fuel manifold 32 includes, for example, two fuel manifolds 32, where each fuel manifold is coupled in flow communication with each combustor 16 by a respective fuel line 34. The first fuel manifold may function to supply the main liquid fuel 14, and the second fuel manifold may function to supply a pilot fuel. Alternatively, fuel manifold 32 includes any suitable number of fuel manifolds 32 that enables combustor assembly 30 to function as described herein.

In the exemplary embodiment, each combustor 16 includes at least one fuel nozzle 12 that is coupled in flow communication with fuel manifold 32 via the respective fuel line 34, and that is coupled in flow communication with water manifold 35 via water line 37. In the illustrated embodiment, each combustor 16 includes five fuel nozzles 12 coupled to fuel manifolds 32. In alternative embodiments, each combustor 16 includes any suitable number of fuel nozzles 12 coupled in any suitable arrangement to fuel manifold 32 that enables combustor assembly 30 to function as described herein. In one embodiment, for each combustor 16, a first set of fuel nozzles 12 are coupled to a first of the fuel manifolds 32 via fuel lines 34, and a second set of the fuel nozzles 12 are coupled to a second fuel manifold 32 via fuel line 34.

In the exemplary embodiment, combustor assembly 30 is in flow communication with a fuel delivery system 40. Fuel delivery system 40 includes a main fuel supply 42 configured to deliver a source flow 44 of fuel 14 (shown in FIG. 1) to combustor assembly 30. Fuel delivery system 40 also includes a pilot fuel supply 46 configured to deliver a source flow 48 of pilot fuel to combustor assembly 30. In addition, fuel delivery system 40 includes a water supply 50 configured to deliver a source flow 52 of water 15 (shown in FIG. 1) to combustor assembly 30. In one embodiment, a valve system 47 includes a control valve 49 downstream from each of main fuel supply 42, water supply 50, and pilot fuel supply 54, and a pump 51 is downstream from each of main fuel supply 42, water supply 50, and pilot fuel supply 54. In certain embodiments, a portion of the liquid fuel 14 may be routed from main fuel supply 42 to pilot fuel supply 46 via a path 54. The source flow 48 of pilot fuel may be used to start combustors 16 with liquid fuel 14 prior to placing source flow 44 of fuel 14 in service. The source flow 48 of pilot fuel may continue to be used after the source flow 44 of fuel 14 is placed in service. The source flow 48 of pilot fuel may be used to start combustors 16 because the source flow 48 of pilot fuel may have a lower flow rate of the liquid fuel 14 than the source flow 44 of fuel 14. In certain embodiments, the flow rate of liquid fuel 14 through the source flow 48 of pilot fuel may be between approximately 5 to 50 percent, for example, of a normal, or regular, fuel flow rate. Thus, a lower flow rate of liquid fuel 14, which may be referred to as pilot fuel, may be used to start combustors 16.

In the exemplary embodiment, main fuel supply 42, pilot fuel supply 46, and water supply 50 are in flow communication with a fuel/water distribution system 56 via the at least one fuel manifold 32 and water manifold 35. Fuel/water distribution system 56 mixes and distributes at least one of source flow 44 of fuel 14, source flow 48 of pilot fuel, and source flow 52 of water 15 into at least one main mix flow 58 in a first mixed fuel line 59, or pilot mix flow 60 in a second mixed fuel line 61, of fuel 14 and/or water 15. Main mix flow 58 and pilot mix flow 60 are each distributed to a corresponding combustor 16. In some embodiments, fuel distribution system 56 also includes suitable fuel conditioning components (not shown). In alternative embodiments, fuel distribution system 56 does not include fuel conditioning components.

In the exemplary embodiment, gas turbine engine 10 (shown in FIG. 1) is a stationary gas turbine engine. Combustor assembly 30 is subject to gravitational force, which is generally indicated by arrow 62. As such, when using liquid fuels, such as liquid fuel 14, and/or water (for mixing with fuel or flushing the fuel lines), the flow distribution is sensitive to static head (i.e. gravity force), particularly at low flow demand conditions of gas turbine engine 10, such as, for example, at low speed operation (i.e. low fuel flow demands) including firing and water washing operations (e.g., when only a small amount of water flow is required). As such, a larger portion of the flow of fuel 14 and/or water 15 flows to the bottom combustors 16 (i.e., those combustors closer to the ground surface) and a smaller flow, and in some instances, nearly no flow, flows to those combustors 16 at the of combustor assembly 30. Increasing the pressure of the liquid fuels, such as liquid fuel 14, and/or water (for mixing with fuel or flushing the fuel lines) can facilitate the uneven distribution of liquid fuels to the different combustors 16, such as those combustors 16 at the of combustor assembly 30. However, increasing the pressure may also increase the flow rates to each of combustors 16.

Figure 3:
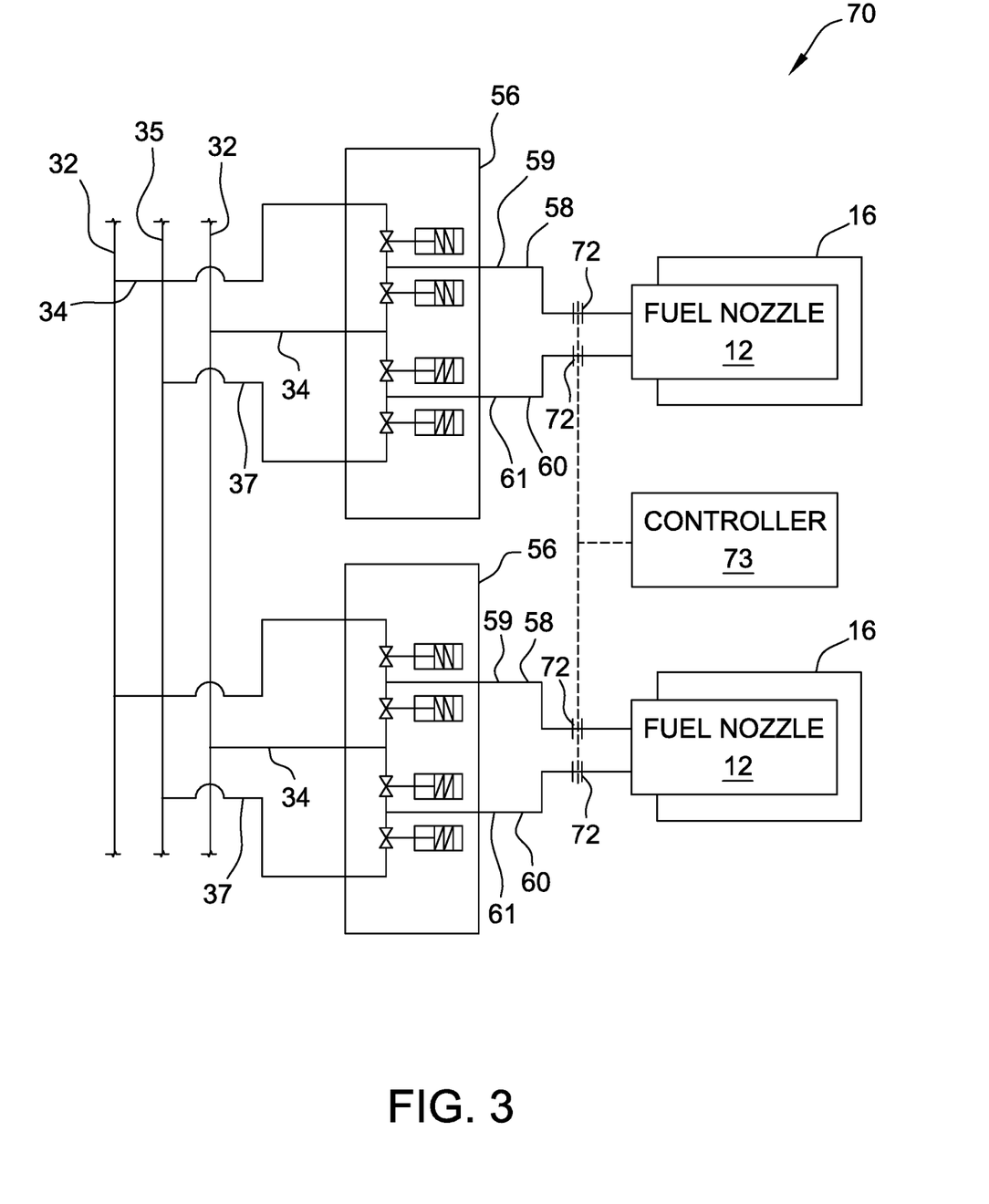
FIG. 3 is a schematic view of an exemplary flow balance system that may be used with the gas turbine engine shown in FIG. 1.

FIG. 3 is a schematic view of an exemplary flow balance system 70 for use with gas turbine engine 10 (shown in FIG. 1). In the exemplary embodiment, flow balance system 70 includes one or more flow balance devices 72 coupled in line of each respective fuel line 34. Flow balance devices 72 can be positioned downstream or upstream of fuel distribution system 56. By regulating the flow to the lower combustors 16, for example, the lower four combustors 16 as shown in FIG. 2, the amount of flow channeled to the remaining combustors 16, and particularly the upper combustors, increases. This facilitates reducing a variation in the flow of fuel and/or water to combustors 16. Reducing the variation in the flow further facilitates reducing thermal gradients between combustors 16. Moreover, in water washing conditions, reducing the variation in the flow increases controllable space of water flows by staying far below the combustor wetting limit.

In the exemplary embodiment, each of flow balance devices 72 includes an orifice plate having an orifice configured to restrict the flow of main mix flow 58 and pilot mix flow 60 from fuel distribution system 56 to each of combustors 16. As a result, flow balance device 72 facilitates reducing a pressure, and therefore the flow, of fuel 14, water 15, and/or a mixture thereof channeled to fuel nozzles 12, and therefore combustors 16. It is appreciated that the orifice can be sized and shaped to provide a desired pressure drop, such that each respective fuel nozzle 12 can be configured for a predetermined pressure drop equal to or different from each other fuel nozzle 12.

In another embodiment, each of flow balance devices 72 includes a pressure regulator coupled in line in each of fuel lines 34, or lines channeling main mix flow 58 and pilot mix flow 60 to combustors 16. Each pressure regulator is configured to adjust a pressure of the flow channeled through each respective line. Alternatively, in other embodiments, each flow balance device 72 includes a valve assembly having an actuator configured to open and close the valve assembly (e.g., a solenoid valve). For example, the actuator of each valve assembly is configured to provide simultaneous control of instantaneous pressure drop across and cyclic durations of fluid flow to each fuel nozzle 12. For example, in one embodiment, an operating parameter of each valve assembly is controlled or adjusted to vary a pressure of main mix flow 58 and pilot mix flow 60 channeled to each fuel nozzle 12. In particular, the actuator may be configured to be pulsed by a controller 73 such that the cyclic durations control the average flowrate through the valve assembly. Additionally, the pressure drop across the valve assembly may be controlled during each pulse of the actuator by regulating the position to which the actuator is moved relative to the valve inlet and/or the valve outlet (not shown). For instance, the displacement of the actuator may be regulated by controller 73 such that valve assembly is partially opened during each pulse. By regulating the distance between the actuator and the valve inlet for each pulse, the pressure drop across the valve assembly may be accurately controlled. In addition, in some embodiments where flow balance devices 72 include solenoid valves in which the valve poppet is configured to be pulsed such that the cyclic durations of the poppet control the average flow rate through the valve, the pulse timing, duration, and/or frequency are regulated to reduce dynamic effects of pulsing on the upstream system pressure and flow of main mix flow 58 and pilot mix flow 60, therefore creating a controlled variable resistance to flow to each fuel nozzle 12.

As described herein, the flow distribution is sensitive to static head (i.e. gravity force), particularly at low flow demand conditions of gas turbine engine 10, such as, for example, at low speed operation (i.e. low fuel flow demands) including firing and water washing operations (e.g., when only a small amount of water flow is required). In some embodiments, flow balance devices 72 can be used to regulate fuel distribution under base loads and/or steady-state operation of gas turbine engine 10. In addition, flow balance devices 72 may be operable to change a dynamic operational characteristic of respective combustors 16 independently of others of the plurality of combustors 16. For example, in some embodiments, flow balance devices 72 are operable to impart an oscillatory component having a predetermined frequency to the main mix flow 58 and pilot mix flow 60 of each of combustors 16 including a flow balance device 72. As described, each flow balance device 72 can have the pulse timing, duration, and/or frequency regulated by a controller, imparting an oscillatory component at the same predetermined frequency to the flow of main mix flow 58 and pilot mix flow 60 to at least one combustor 16.

Additionally, a different combustor having an additional flow balance device 72 coupled thereto can be operated with a different predetermined pulse timing, duration, and/or frequency. An oscillatory component at the same predetermined frequency is imparted to main mix flow 58 and pilot mix flow 60 through its respective line. However, because flow balance devices 72 are coupled separately to each combustor 16, no corresponding oscillatory component is imparted to a flow of fuel 14 to other combustors of the combustor assembly 30. Thus, the oscillatory component of fuel flow to one combustor 16 changes the combustion dynamics of that respective combustor independently of a separate combustor 16 of combustor assembly 30. Thus, the oscillatory components in the flow of fuel to each respective combustor 16 in turn at least partially determine the respective combustion dynamics of the combustors 16. In some embodiments, the predetermined pulse timing, duration, and/or frequency is actively selected and/or modified during operation of combustor assembly 30 based on observed combustion dynamics of combustors 16. Thus, in some embodiments, flow balance system 70 enables active reduction of a wide range of combustion dynamics in combustors 16.

While only two combustors are shown in FIGS. 2 and 3 including flow balance devices 72, it is noted that each combustor 16 can include a flow balance device 72 in line of each respective line in flow communication with each fuel nozzle 12. In some embodiments, a single flow balance device 72 may be used to control the flow of main mix flow 58 and pilot mix flow 60 to more than one fuel nozzle 12 and/or combustor 16.

Figure 4:
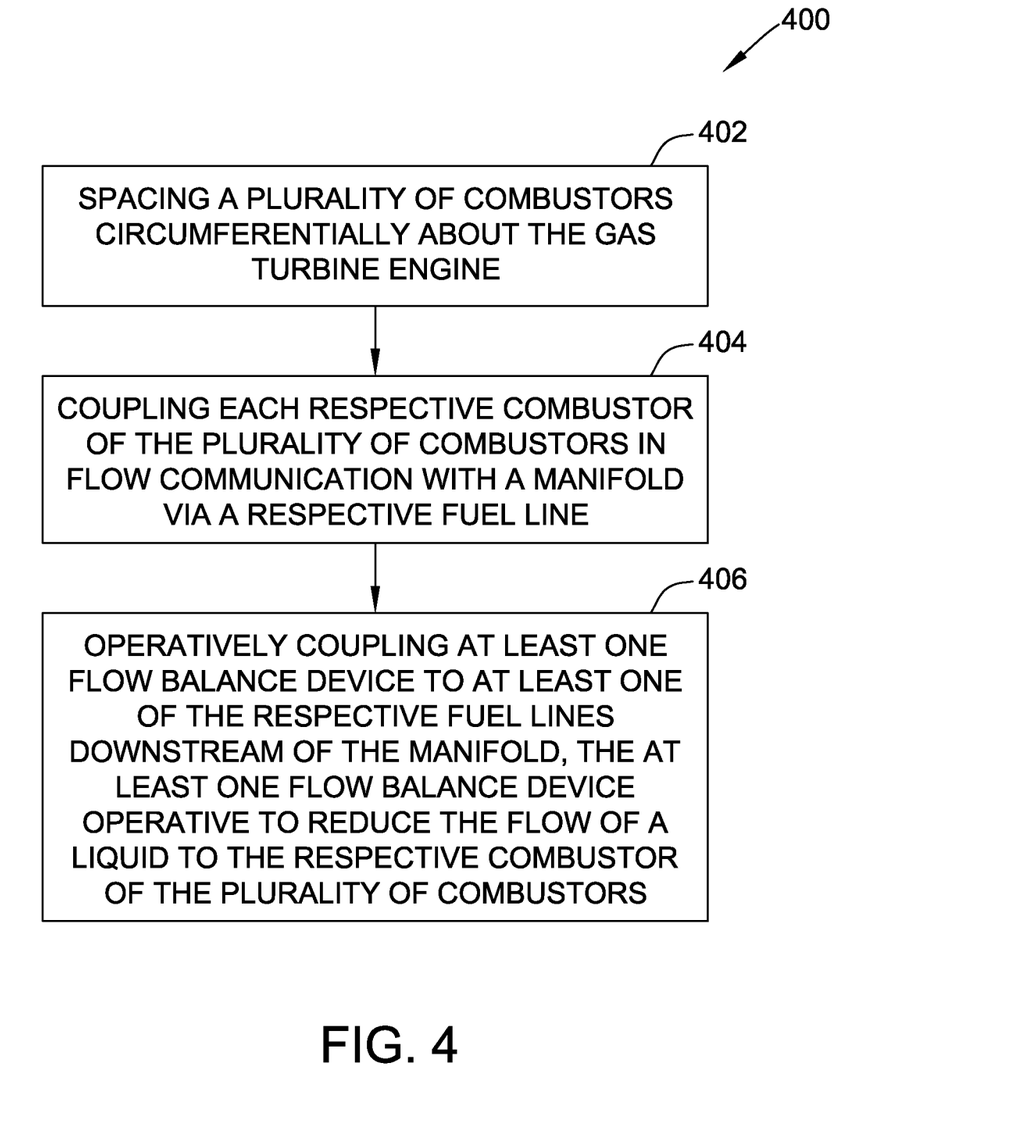
FIG. 4 is a flow diagram of an exemplary method of assembling of a combustor assembly, such as the exemplary combustor assembly shown in FIG. 2.

FIG. 4 is a schematic diagram of an exemplary method 400 of assembling a combustor assembly, such as combustor assembly 30, for a gas turbine engine, such as gas turbine engine 10. With reference to FIGS. 1-4, in the example embodiment, method 400 includes spacing 402 a plurality of combustors, such as combustors 16, circumferentially about a gas turbine engine, such as gas turbine engine 10. Method 400 also includes coupling 404 each of the combustors 16 in flow communication with at least one fuel manifold, such as fuel manifold 32, via a respective fuel line, such as fuel line 34. Method 400 also includes coupling 406 a flow balance device, such as flow balance device 72, operatively to at least one fuel line, downstream of the fuel manifold 32. The flow balance device is operable to reduce the flow of fuel through the at least one fuel line and to the respective combustor 16, to facilitate increasing a pressure of the fuel in the fuel manifold 32, which facilitates reducing the flow variation to each of combustors 16.

Exemplary embodiments of a combustor assembly and a method for assembling the combustor assembly are described above in detail. The embodiments include a flow balance system operable to reduce or restrict a flow of fuel, water, and/or a mixture of fuel and water to respective combustors of the combustor assembly. The flow balance system facilitates increasing a pressure of the flow of fuel, water, and/or a mixture of fuel and water in the fuel manifold, which facilitates reducing the flow variation to each of the combustors of the combustor assembly. The flow balance system includes a flow balance device coupled between the fuel manifold and a respective combustor to selectively reduce or restrict the flow to that respective combustor, independent of other combustors of the combustor assembly. In some embodiments, the flow balance device includes and orifice plate having an orifice sized to reduce the flow to the respective combustor. In other embodiments, the flow balance device includes a pressure regulator coupled in line with the fuel lines, or a valve assembly having an actuator configured to open and close the valve assembly electronically.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. For example, components of each system and/or steps of each method may be used and/or practiced independently and separately from other components and/or steps described herein. Additionally, while various embodiments of the disclosure have been described, it is to be understood that aspects of the disclosure may include only some of the described embodiments, and that each component and/or step may also be used and/or practiced with other systems and methods. Accordingly, the disclosure is not to be seen as limited by the foregoing description, but is only limited by the scope of the appended claims.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" or "an embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A combustor assembly for a gas turbine engine, said combustor assembly comprising:
 a plurality of combustors spaced circumferentially about the gas turbine engine that is a stationary gas turbine engine, each of said combustors coupled in flow communication with a manifold configured to channel a liquid to said plurality of combustors, and wherein the plurality of combustors comprise an upper set of combustors and a lower set of combustors as defined by a direction of gravitational force;
 a plurality of fuel lines coupled in flow communication with the manifold, a respective fuel line of said plurality of fuel lines coupled in flow communication with each respective combustor of said plurality of combustors;
 a valve system comprising at least one valve coupled to each said fuel line coupled between the manifold and said respective combustor;
 a flow balance system comprising a plurality of flow balance devices, wherein a respective flow balance device is coupled to a respective fuel line associated with combustors in the lower set of combustors, said plurality of flow balance devices coupled downstream from said at least one valve, and wherein each respective flow balance device is configured to discharge the liquid only within the respective fuel line in which each respective flow balance device is coupled; and a controller coupled to said plurality of flow balance devices to control operation of each said respective flow balance device associated with the lower set of combustors to selectively restrict a flow of liquid channeled to the lower set of combustors such that the flow of liquid channeled to the upper set of combustors is increased.

2. The combustor assembly in accordance with claim 1, wherein each said respective flow balance device is operable to increase a pressure of the liquid in the manifold to reduce a variation in the flow of the liquid to each said respective combustor of said plurality of combustors in the lower set of combustors.

3. The combustor assembly in accordance with claim 1, wherein said each flow balance device comprises an orifice plate comprising at least one orifice defined therethrough.

4. The combustor assembly in accordance with claim 1, wherein each said respective flow balance device comprises a valve assembly comprising an actuator configured to open and close said valve assembly, said actuator configured to provide simultaneous control of instantaneous pressure drop across, and of cyclic durations of the flow of liquid to, said respective combustor of said plurality of combustors in the lower set.

5. The combustor assembly in accordance with claim 4, wherein each said respective flow balance device is operable to impart an oscillatory component having a predetermined frequency to the flow of liquid through said fuel lines associated with the lower set of combustors.

6. The combustor assembly in accordance with claim 5, wherein the oscillatory component having a predetermined frequency is generated by regulating at least one of a pulse timing, a duration, and/or a frequency of said actuator.

7. The combustor assembly in accordance with claim 1, wherein said each flow balance device comprises a pressure regulator coupled in line with said one of said each fuel line of said plurality of fuel lines, said pressure regulator configured to adjust a pressure of the liquid in the manifold.

8. The combustor assembly in accordance with claim 1, wherein the manifold is at least one of a fuel manifold and a water manifold.

9. The combustor assembly in accordance with claim 8, wherein the manifold is a water manifold, and further comprising a water line coupled in flow communication with said water manifold and with a respective combustor of said plurality of combustors.

10. The combustor assembly in accordance with claim 1, wherein said plurality of fuel lines comprises a main fuel line configured to channel main fuel towards said plurality of combustors, and a pilot fuel line configured to channel pilot fuel towards said plurality of combustors.

11. A gas turbine engine comprising:
a compressor; and
a combustor assembly coupled in flow communication with said compressor, said combustor assembly comprising:
  a plurality of combustors spaced circumferentially about the gas turbine engine that is a stationary ground-based gas turbine engine, each of said combustors coupled in flow communication with a manifold configured to channel a liquid to said plurality of combustors, and wherein the plurality of combustors comprise an upper set of combustors and a lower set of combustors as defined by a direction of gravitational force;
  a plurality of fuel lines coupled in flow communication with the manifold, a respective fuel line of said plurality of fuel lines coupled in flow communication with each respective combustor of said plurality of combustors;
  a valve system comprising at least one valve coupled to each fuel line between the manifold and said respective combustor;
  a flow balance system comprising a plurality of flow balance devices, wherein a respective flow balance device is coupled to a respective fuel line associated with combustors in the lower set of combustors, said plurality of flow balance devices coupled downstream from said at least one valve, and wherein each respective flow balance device is configured to discharge the liquid only within the respective fuel line in which each respective flow balance device is coupled; and
  a controller coupled to said plurality of flow balance devices, said controller configured to control operation of each said respective flow balance device associated with the lower set of combustors to selectively restrict a flow of liquid channeled to the lower set of combustors such that the flow of liquid channeled to the upper set of combustors is increased.

12. The gas turbine engine in accordance with claim 11, wherein each said respective flow balance device is operable to increase a pressure of the liquid in the manifold to reduce a variation in the flow of the liquid to each said respective combustor of said plurality of combustors in the lower set of combustors.

13. The gas turbine engine in accordance with claim 11, wherein said each flow balance device comprises an orifice plate comprising at least one orifice defined therethrough.

14. The gas turbine engine in accordance with claim 11, wherein each said respective flow balance device comprises a valve assembly comprising an actuator configured to open and close said valve assembly, said actuator configured to provide simultaneous control of instantaneous pressure drop across, and of cyclic durations of the flow of liquid to, said respective combustor of said plurality of combustors in the lower set of combustors.

15. The gas turbine engine in accordance with claim 14, wherein each said respective flow balance device is operable to impart an oscillatory component having a predetermined frequency to the flow of liquid through said fuel lines associated with the lower set of combustors.

16. The gas turbine engine in accordance with claim 15, wherein the oscillatory component having a predetermined frequency is generated by regulating at least one of a pulse timing, a duration, and/or a frequency of said actuator.

17. The gas turbine engine in accordance with claim 11, wherein said each flow balance device comprises a pressure regulator coupled in line with said one of said each fuel line of said plurality of fuel lines, said pressure regulator configured to adjust a pressure of the liquid in the manifold.

18. The gas turbine engine in accordance with claim 11, wherein the manifold is at least one of a fuel manifold and a water manifold.

19. The gas turbine engine in accordance with claim 18, wherein the manifold is a water manifold, and further comprising a water line coupled in flow communication with said water manifold and with a respective combustor of said plurality of combustors.

20. The gas turbine engine in accordance with claim 11, wherein said plurality of fuel lines comprises a main fuel line configured to channel main fuel towards said plurality of combustors, and a pilot fuel line configured to channel pilot fuel towards said plurality of combustors.

\* \* \* \* \*